United States Patent
Menon et al.

(10) Patent No.: US 7,024,635 B1
(45) Date of Patent: Apr. 4, 2006

(54) MODELING A COMPUTING ARCHITECTURE

(75) Inventors: Jai Menon, Alpharetta, GA (US); Donna Hodges, Cumming, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 640 days.

(21) Appl. No.: 09/990,011

(22) Filed: Nov. 21, 2001

(51) Int. Cl.
  *G06F 3/00* (2006.01)
  *G06F 9/00* (2006.01)
  *G06F 17/00* (2006.01)

(52) U.S. Cl. ............ 715/771; 715/420; 715/440; 715/969; 715/734; 703/21; 703/22; 709/224; 717/104

(58) Field of Classification Search ............ 345/420, 345/440–440.2, 734–736, 853–854, 969; 370/254; 703/13–22; 709/223–224; 717/104; 715/771
  See application file for complete search history.

(56) References Cited

U.S. PATENT DOCUMENTS

| | | | |
|---|---|---|---|
| 5,249,296 A * | 9/1993 | Tanaka .................. | 345/799 |
| 5,426,422 A * | 6/1995 | Vanden Heuvel et al. . | 340/7.48 |
| 6,208,345 B1 * | 3/2001 | Sheard et al. ............ | 345/853 |
| 6,611,495 B1 * | 8/2003 | Meyer et al. ............ | 370/230.1 |
| 2001/0012990 A1 * | 8/2001 | Zimmerman et al. ...... | 703/13 |
| 2001/0054035 A1 * | 12/2001 | Lee ......................... | 707/3 |

OTHER PUBLICATIONS

Synapse, Synapse: Banalyzer—Online Network Protocol Database, Dec. 3, 1998, p. 1.*
www.rational.com/products/softdev.jsp#rose. "Model Driven Development With UML Rational Rose", Copyright 2001, Rational Software Corporation.
www.embarcadero.com "Embarcadero Change Manager: Respond Quickly to Change Without Downtime or Lose Data," Jan. 2002, Embarcadero Technologies.
www.embarcadero.com "ER/Studio: Enterprise Data Modeling," Jan. 2002, Embarcadero Technologies.
www3.ca.com/Solutions/Solution.asp?id=1629 "Paradigm Plus: Effective analysis and Design With Enterprise Component Modeling," Copyright 2002.

* cited by examiner

*Primary Examiner*—Kristine Kincaid
*Assistant Examiner*—Ryan F. Pitaro
(74) *Attorney, Agent, or Firm*—Withers & Keys, LLC (57) ABSTRACT

A method for modeling a computing architecture is provided. Computing layers of the computing architecture are identified, wherein each computing layer represents a functional layer of the computing architecture. Computing systems of the computing system are identified. Computing layers implemented by the computing system are identified. Stacked bars are displayed to represent the computing layers. Second bars orthogonal to the stacked bars are displayed to represent the computing systems, wherein each second bar extends through a portion of the stacked bars an amount corresponding to the computing layers implemented by the computing system represented by the second bar.

22 Claims, 5 Drawing Sheets

MODELING A COMPUTING ARCHITECTURE

FIELD OF THE INVENTION

The invention generally relates to the field of modeling computing architectures. More particularly, the invention relates to graphically modeling a computing architecture that comprises multiple computing systems.

BACKGROUND OF THE INVENTION

Computing systems, which may comprise, for example, an application or a plurality of applications, have become increasingly complex. Indeed, the sheer number of computing systems has increased dramatically in recent years. Also, each computing system itself often becomes more complex as it evolves through revision releases and the like. Moreover, computing systems typically interconnect to an increasing number of other computing systems as such systems are integrated into a larger computing architecture.

Further, more and more computing systems are integrated into computing architectures. As such, modeling a computing architecture has become more challenging. For example, an enterprise may have a multitude of computing systems with each computing system comprising a multitude of applications. The applications and/or systems may include purchased applications, developed applications, legacy systems, and the like. Each of these applications and/or systems may have its own database, a shared database, a website interface, a machine interface, a connection to other computing systems, a connection to other computing applications, and the like. Due to these many complexities and the highly integrated nature of computing, modeling complex computing architectures on an enterprise level is often very difficult.

Nonetheless, the need to communicate such computing architectures at an enterprise level to both technical and non-technical people, is important to achieving business success and to building computing architectures that are efficient, maintainable, and conducive to future growth. Further, the ability to depict the computing architecture at an appropriate level of detail for a specific target audience is important. For example, a member of a board of directors may prefer to be presented with a high-level view of an enterprise computing architecture to determine where to invest resources, while an application developer may prefer to be presented with a mid-level view of a computing system to determine how to integrate new functionality into the computing architecture.

In view of the foregoing, there is a need for a method for flexibly and dynamically representing a computing architecture at various levels of detail.

SUMMARY OF THE INVENTION

According to an aspect of the invention, systems and methods are provided for modeling a computing architecture at various levels of detail.

In a method for modeling a computing architecture in accordance with the invention, computing layers of the computing architecture are identified, wherein each computing layer represents a functional layer of the computing architecture. Computing systems are identified and computing layers implemented by the computing systems are identified. Stacked bars are displayed to represent the computing layers. A second set of bars orthogonal to the stacked bars are displayed to represent the computing systems, wherein each second bar extends through a portion of the stacked bars by an amount corresponding to the computing layers implemented by the computing system represented by the second bar.

A first rectangle that represents a human interface portal may be displayed adjacent to the stacked bars. A second rectangle that represents a business to business integration may also be displayed adjacent to the stacked bars. Icons representing a preselected area, a data store, or a computing function may be displayed in an area of the model as well.

Further details of the computing architecture may also be displayed upon selection of a computing system. Subsystems of the selected computing system are displayed as second bars orthogonal to stacked bars, as above.

The above-listed features, as well as other features, of the invention will be more fully set forth hereinafter.

BRIEF DESCRIPTION OF THE DRAWINGS

The invention is further described in the detailed description that follows, by reference to the noted plurality of drawings by way of non-limiting illustrative embodiments of the invention, in which like reference numerals represent similar parts throughout the several views of the drawings, and wherein.

DETAILED DESCRIPTION OF ILLUSTRATIVE EMBODIMENTS

Figure 1:
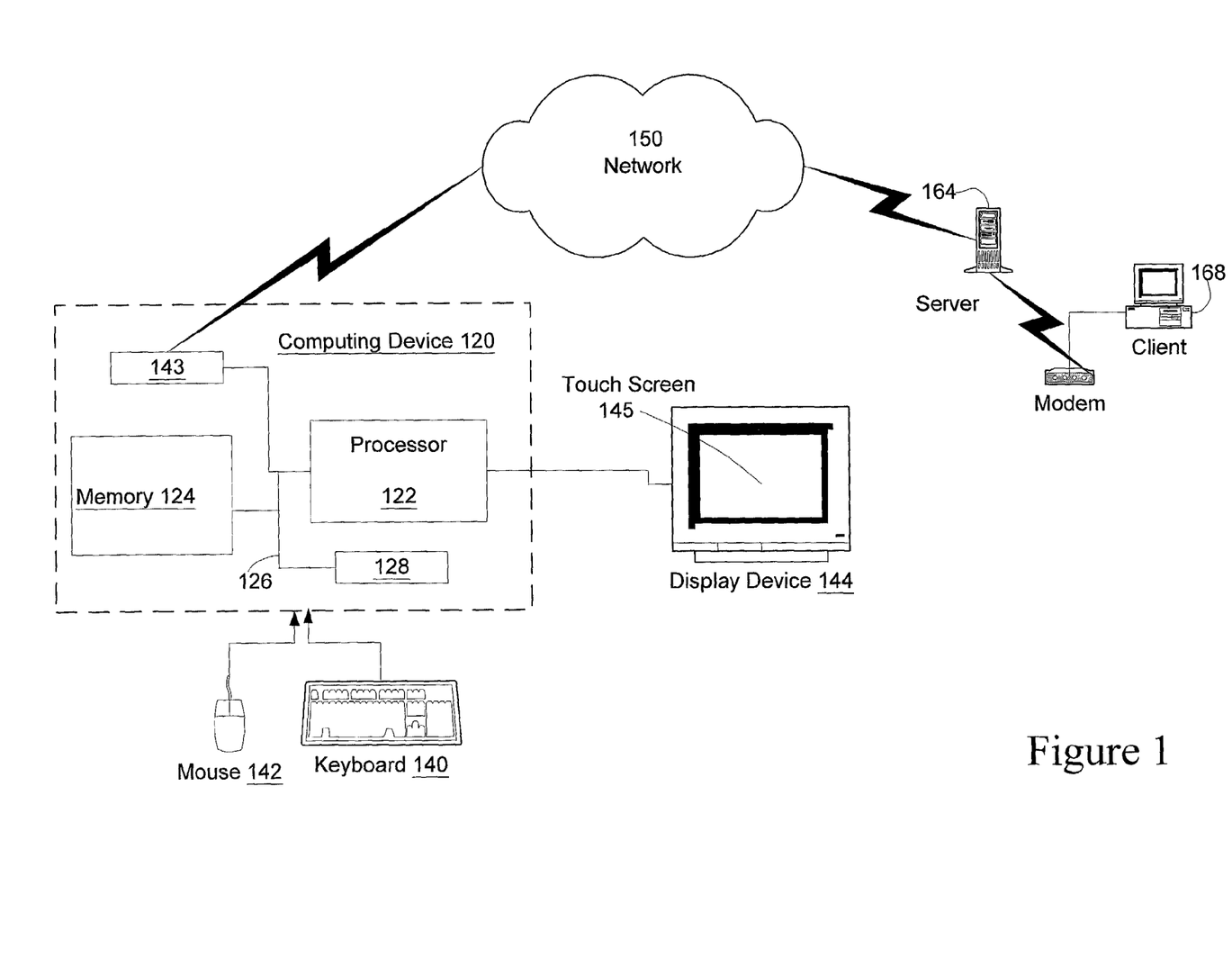
FIG. 1 is a diagram of a generic computer system with which the invention may be employed.

FIG. 1 is a diagram of a generic computer system with which the invention may be employed. As shown in FIG. 1, computing device 120 includes processor 122, system memory 124, and system bus 126 that couples various system components including system memory 124 to processor 122. System memory 124 may include read-only memory (ROM) and/or random access memory (RAM). Computing device 120 may further include hard-drive 128, which provides storage for computer readable instructions, data structures, program modules, data, and the like. A user (not shown) may enter commands and information into the computing device 120 through input devices such as a keyboard 140 and/or a mouse 142. A display device 144, such as a monitor, a flat panel display, or the like is also connected to the computing device 120 for output. Display device 144 includes touch screen 145. Display device 144 may also include other pointing devices such as a light pen, a grid of light beams, or the like for inputting information into processor 122. Communications device 143, which may be a modem, provides for communications over network 150. Processor 122 can be programmed with instructions to interact with other processors so as to perform the techniques described below. The instructions may be received from network 150 or stored in memory 124 and/or hard drive 128. Processor 122 may be loaded with any one of several computer operating systems such as WINDOWS NT operating system, WINDOWS 2000 operating system, LINUX operating system, and the like.

As shown in FIG. 1, computing device 120 may communicate with other computing devices, such as, for example, server 164 over network 150. Network 150 may be the Internet, a local area network, a wide area network, or the like. Server 164 may communicate e-mails, web pages, and other data. Server 164 may be operated by an ISP, a corporate computer department, or any other organization or person with a server connected to network 150. Server 164 is accessible by client stations 168 from which users may send and receive data and browse web pages. Client stations 168 may connect to servers via a local area network (not shown) or using a remote connection device 172 such as, for example, a modem, as is shown in connection with server 164.

In an illustrative embodiment of the present invention, horizontal bars represent computing layers and vertical bars represent computing systems. The vertical bars extend through a portion of the horizontal bars and thereby designate the computing layers that the corresponding computing system implements. In this manner, a computing architecture may be modeled that may be more readily understood by both technical and non-technical people. The number of computing layers is limited to a manageable number and each computing system is typically represented by a single vertical bar. Beyond layers and systems, more details of the computing architecture may be modeled onto the computing architecture model, for example, with marks or icons at various positions in the model.

Figure 2:
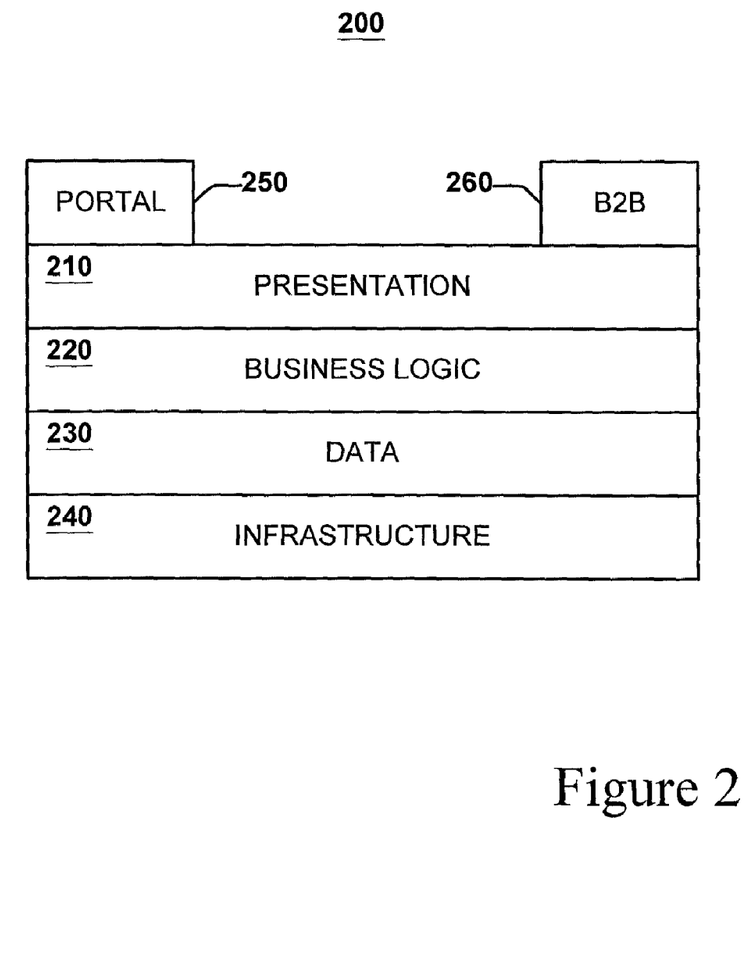
FIG. 2 is a diagram of an illustrative layer model for representing layers of a computing architecture, in accordance with an embodiment of the invention.

FIG. 2 is a diagram of an illustrative layer model for representing layers of a computing architecture. As shown in FIG. 2, computing architecture layer model 200 comprises a plurality of horizontal bars, wherein each horizontal bar represents a layer of a computing architecture. In the illustrative model of FIG. 2, computing architectural layer model 200 comprises presentation layer bar 210, business logic layer bar 220, data layer bar 230, and infrastructure layer bar 240.

Presentation layer bar 210 represents the user interface functionality of a computing system. For example, presentation layer bar 210 may represent a portion of a computing system that displays information on a user interface (e.g., display device 144 of FIG. 1). Business logic layer bar 220 represents portions of the computing system directed to business logic functionality. For example, business logic layer 220 may represent a search engine for RealPages$^{SM}$-.com, an online telephone directory application. Data layer bar 230 represents data of the enterprise. For example, data layer bar 230 may represent a database for RealPages$^{SM}$-.com. Infrastructure layer bar 240 represents the infrastructure for implementing computing systems such as security systems, content management systems, and the like.

Model 200 also includes a first rectangle 250 representing a portal. Portal rectangle 250 may represent an Internet website interface that may be accessed via an Internet access device, such as for example, a browser, a cellular telephone, a two-way Internet wireless communication device, a television compatible browser, and the like.

Model 200 further includes a second rectangle 260 representing a business to business integration. Such a business to business integration rectangle 260 may represent a business to business exchange, a business to business marketplace, and the like.

Model 200 is more simplistic than the OSI network model which has seven layers including the following: an application, presentation, session, transport, network, data link, and physical layer. As such, computing architecture model 200 provides a model that can be more easily and quickly grasped. Both technical and non-technical people may quickly understand the concepts of the four layer model. For example, the concept that the presentation layer is for presentation to a user and that the business logic layer performs logic on the data of the data layer is relatively straightforward. This simplified model may be easier to comprehend than the relatively technical concepts of session and transport layers of the OSI model that may be very unfamiliar to non-technical people. While a four layer model is illustrated, the model may include various numbers of layers and may employ other groupings to model a computing architecture. Thus, an enterprise may select a number of layers and groupings consistent with its internal model.

Figure 3:
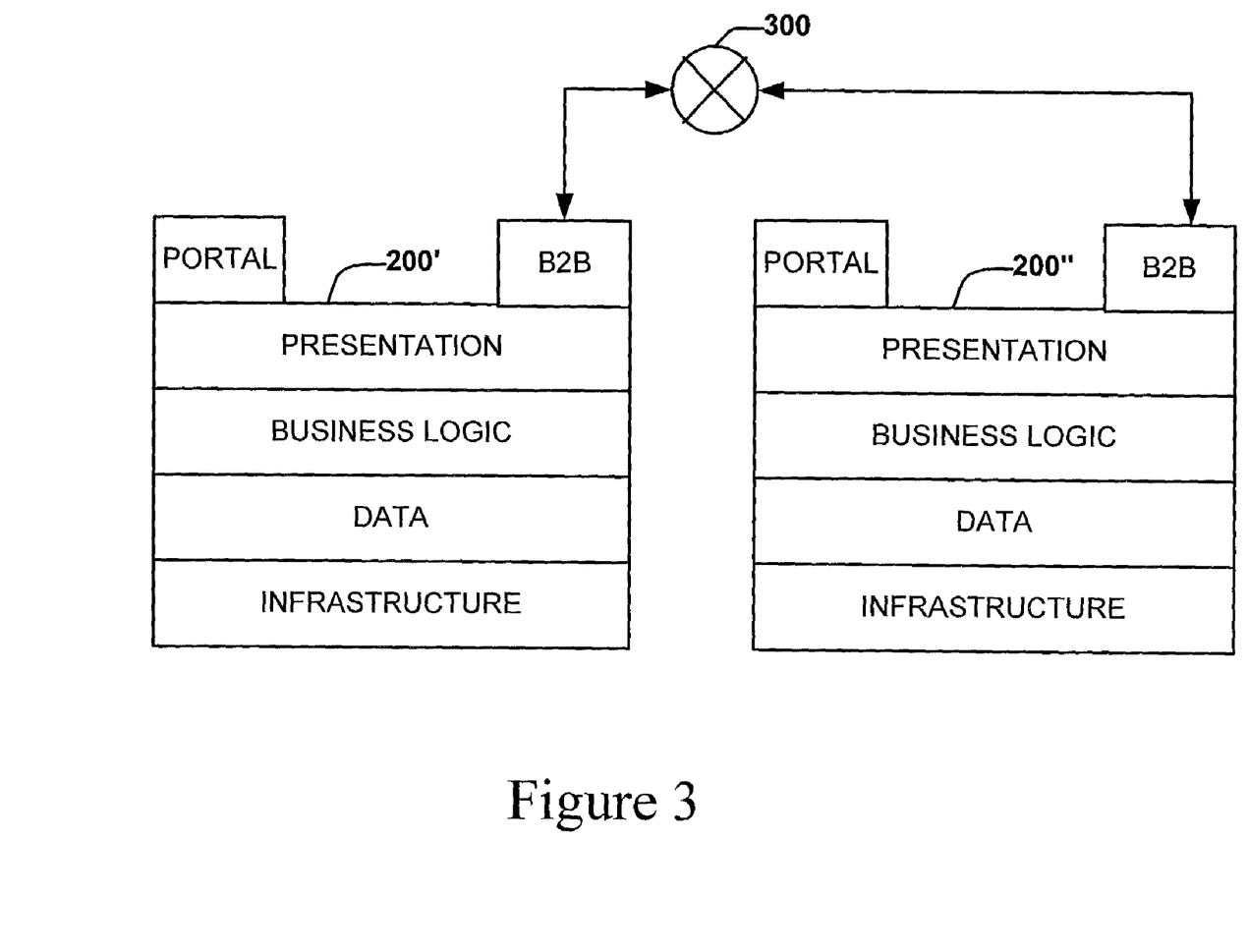
FIG. 3 is a diagram of an illustrative model of connection of two computing architectures, in accordance with an embodiment of the invention.

Connectivity between enterprises can also be modeled. A business to business interchange computing architecture model is illustrated in FIG. 3, using the four layer model of FIG. 1. As shown in FIG. 3, a first computing architecture model 200' of a first enterprise is in communication with a second computing architecture model 200'' of a second enterprise. The first and second computing architectures models 200' and 200'' are shown connected by control point icon 300.

The computing architecture may be depicted at various levels of detail. Thus, on a computing device, such as computing device 120 of FIG. 1, a user (not shown) may select, via mouse 142, a computing architecture model, a mark, or icon displayed on display device 144. In response to such selection, further details of the selected computing architecture, mark, or icon are displayed on the display device. For example, selection of control point icon 300 of FIG. 3 causes further details (not shown) of the control point represented by icon 300 to be displayed. Similarly, selection of computing architecture layer model 200' causes further details of the computing architecture represented by model 200' to be displayed.

Figure 4:
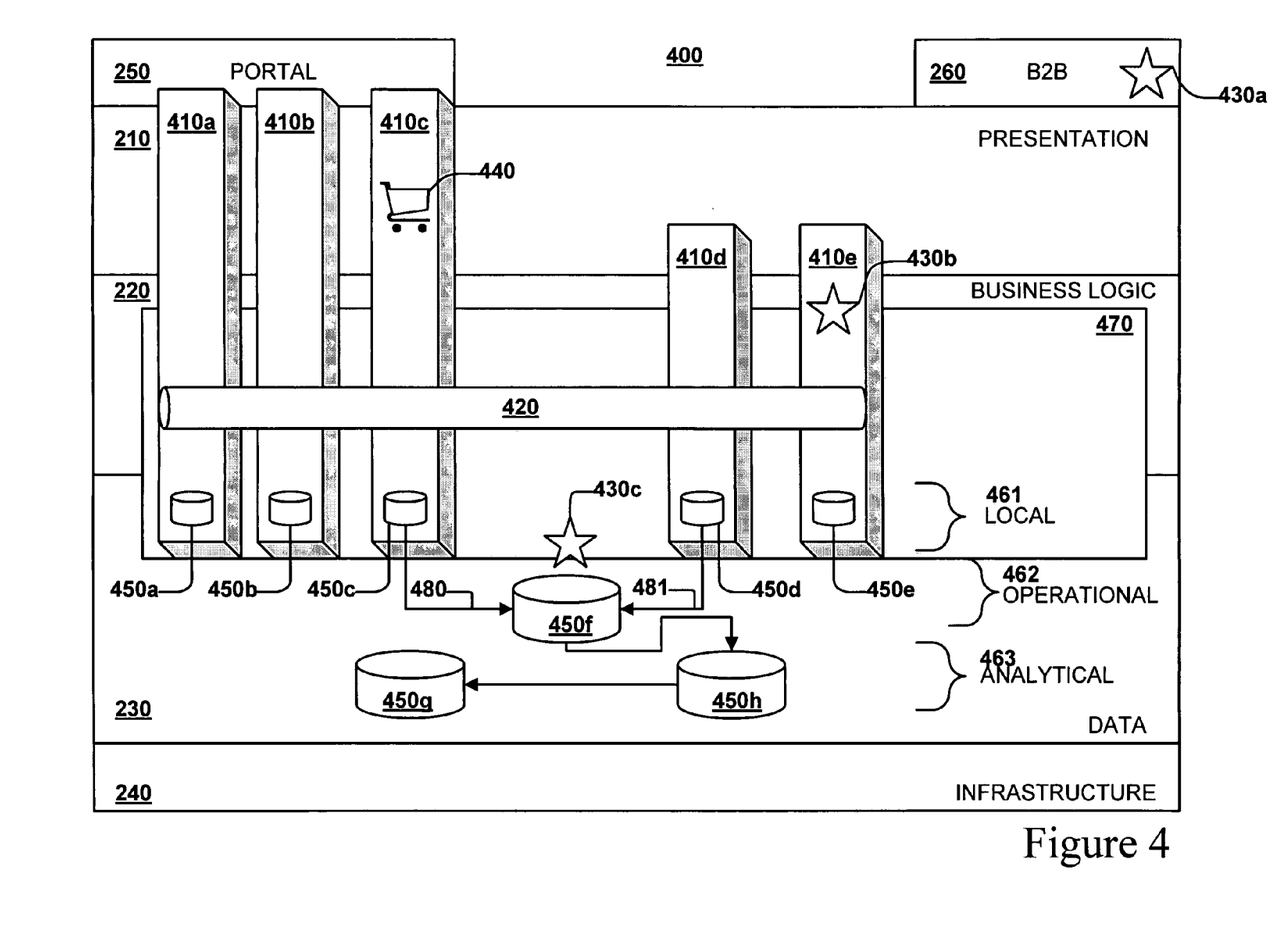
FIG. 4 is a diagram of an illustrative model of a computing architecture including illustrative representations of computing systems, in accordance with an embodiment of the invention.

An example of such details is shown in computing architecture model 400 of FIG. 4. FIG. 4 is a diagram of an illustrative model of a computing architecture including computing systems. As shown in FIG. 4, computing architecture model 400 comprises a plurality of horizontal bars 210, 220, 230, 240 in stacked relationship to each other. The horizontal bars represent presentation layer 210, business logic layer 220, data layer 230, and infrastructure layer 240, respectively. Model 400 also comprises a portal rectangle 250 and a business to business integration rectangle 260 adjacent to presentation layer bar 210.

Model 400 also comprises a plurality of vertical bars extending through the horizontal bars. Each vertical bar represents a computing system and extends through the horizontal bars an amount corresponding to the computing layers implemented by the computing system represented by the vertical bar. Computing system bar 410a extends from data layer bar 230, through business logic layer bar 220, through presentation layer bar 210, and to portal rectangle 250. Bar 410a extends through data layer bar 230, through business logic layer bar 220, through presentation layer bar 210, indicating that the computing system represented by bar 410a implements logic corresponding to each of these computing layers. Computing system bar 410a contacts portal rectangle 250, indicating that the computing system represented by bar 410*a* is accessible via a portal. The computing system represented by bar 410*a* may be for example, RealPages$^{SM}$.com, an online telephone directory application accessible via the Internet. Computing system bar 410*a* may or may not be displayed extending into infrastructure layer bar 240. Computing system bar 410*a* also includes an icon 450*a* representing that the computing system represented by bar 410*a* includes a data store.

Model 400 further comprises computing system bars 410*b* and 410*c*. Bars 410*b* and 410*c* may represent other computing systems, such as, for example, an electronic bill payment and bill presentation computing system, a new connection order computing system, a change order computing system, a customer registration computing system, an integrated product catalog computing system, and the like.

Model 400 also comprises a computing system bar 410*d* that extends from data layer bar 230, through business logic layer bar 220, to presentation layer bar 210, indicating the computing system represented by bar 410*d* implements logic corresponding to each of these layers. Computing system bar 410*d* does not contact portal rectangle 250, thereby, indicating that the computing system represented by bar 410*d* is not accessible via a portal. The computing system represented by bar 410*d* may be for example, a legacy system, a billing system, and the like. Computing system bar 410*d* may or may not be displayed extending into infrastructure layer bar 240. Computing system 410*d* also includes a mark or icon 450*d* indicating that the computing system represented by bar 410*d* includes a data store.

Marks or icons may be used to designate special items of note associated with a particular computing system or with a particular portion of the computing architecture. Thus, computing system bar 410*e* is similar to computing system bar 410*d* but further comprises an icon 430*b* indicating a preselected area of the computing architecture. Icon 430*b* may be a star or other symbol and may be used to identify a portion of the computing architecture that is deserving of special designation. For example, icon 430*b* may indicate a "problem" area in the computing architecture, an area having a technical issue, an area of a developing industry trend, or the like. Icon 430*a* may indicate that there are technical issues within business to business integration, such as, for example, immature industry standards, rudimentary tools, and the like. Icon 430*c* is disposed proximate to data store 450*f* and may indicate that there are technical issues with integrating data into data store 450*f*.

Other such marks or icons may be incorporated into model 400. Computing system bar 410*c* comprises icon 440 indicating a predefined computing function of the computing architecture. Icon 440 may be any symbol, but typically is a symbol that is indicative of the computing function. As shown, icon 440 is a shopping cart icon and indicates a shopping cart computing function. Icon 440 may be used, for example, to illustrate that many computing systems include a particular computing function and to illustrate consistency or inconsistency between the computing functions of various computing systems.

Computing architecture model 400 also comprises icons 450*f*, 450*g*, and 450*h* representing data stores. As shown, each icon 450*f*, 450*g*, 450*h* is a data store icon and represents a data store that is located in data layer bar 230. The data layer represented by data layer bar 230 is further divided into sub-layers by notations 461, 462, and 463. Notation 461 defines a sub-layer of data layer bar 230 that represents data stores local to computing systems 410. Notation 462 defines a sub-layer of data layer bar 230 that represents data stores containing operational data and notation 463 defines a sub-layer of data layer bar 230 that represents data stores containing analytical data. As can be seen in FIG. 4, data stores 450*a* through 450*e* are located in the sub-layer defined by mark 461. Data store 450*f* is located in the sub-layer defined by mark 462 and data stores 450*g* and 450*h* are located in the sub-layer defined by notation 463. In this manner, a particular sub-layer of a computing architecture may be indicated, such that both technical and non-technical people may be able to comprehend the area and its relation to the entire computing architecture. In addition, connectivity between computing systems and devices or functions represented by icons may be modeled, as described in more detail below.

Connection lines indicate interconnectivity between data stores. For example, the data stores represented by icons 450*c* and 450*d* are capable of uploading data to the data store represented by icon 450*f*. This interconnectivity between the data stores is represented by connection lines 480, 481, respectively. Arrow heads may be used to model a direction of data flow.

To indicate interconnectivity between computing systems 410*a* through 410*e*, horizontal conduit 420 is located in business logic layer bar 220 and extends through each of computing systems 410*a* through 410*f* and represents communication between such computing systems. Communications horizontal conduit 420 may represent a message broker data bus, a local area network, a wide area network, or the like. In this manner, both technical and non-technical people may be able to quickly comprehend the interconnections of computing systems and other devices of the computing architecture.

Computing architecture model 400 also comprises a mark 470 indicating a preselected region of the computing architecture. Mark 470 is a rectangle that encompasses a portion of business logic layer bar 220 and a portion of data layer bar 230. Mark 470 may indicate a middle tier of computing architecture model 400 that comprises a portion of business logic bar 220 and a portion of data logic bar 230. With such a region mark, regions of the computing architecture may be indicated that encompass all or portions of layer bars 210 through 240 and all or a portion of the computing systems. For example, middle tier region mark 470 indicates a region of computing architecture that may include system interconnectivity and database synchronization issues.

Computing architecture model 400 may be manipulated in other ways to present details in a particular section. For example, some horizontal bars may be scaled larger than other bars to allow more room for detail, for marks, to illustrate relative importance, complexity, or the like.

Thus, computing architecture model 400 can represent a complex computing architecture in a single, easy to comprehend model. The model can be comprehended by both technical and non-technical people alike. Details of the computing architecture can be displayed as necessary upon request. For example, if implemented on computing device 120 of FIG. 1, a user may select a computing system of computing architecture model 400 of FIG. 4. Upon selection of a computing system, the selected computing system may be displayed as a model similar to computing architecture model 400. As such, a user can "drill-down" to an appropriate level of detail, and the information is displayed in a consistent manner. Accordingly, the user does not have to learn a new model for a computing architecture; rather, the same basic model is used at multiple levels.

Figure 5:
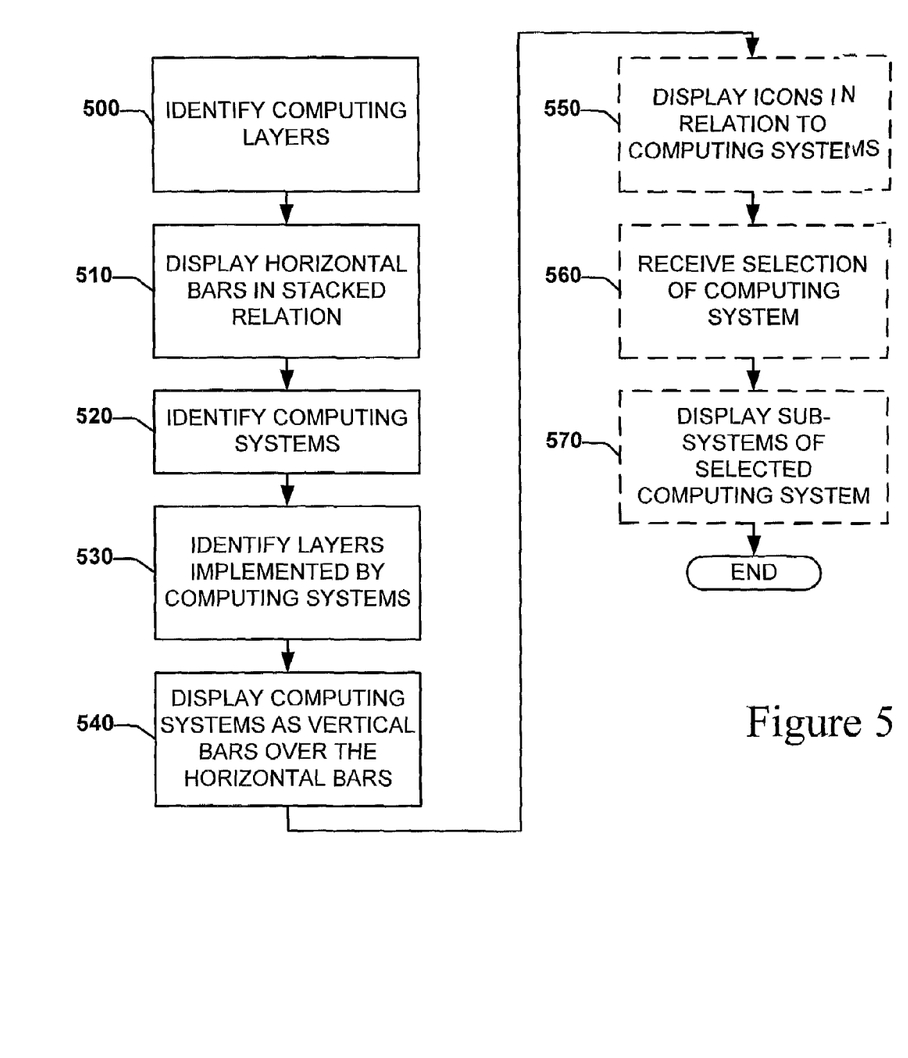
FIG. 5 is a flow chart of an illustrative method for modeling a computing architecture, in accordance with an embodiment of the invention.

FIG. 5 is a flow chart of an illustrative method for representing a computing architecture in a manner consistent with that described above in connection with FIG. 4. The method may be performed by a computer processor, such as, for example, processor 122 of FIG. 1. It is, however, contemplated that the method may be performed other ways.

As shown in FIG. 5, at step 500, processor 122 identifies a number of computing layers corresponding to the computing architecture. The number of layers may be predefined and constant for a given enterprise and the number of layers may be determined based on a lookup from a database or from analysis of the functionality of computing systems.

At step 510, processor 122 displays on display device 144 a plurality of horizontal bars in stacked relationship to each other, wherein each horizontal bar represents a computing layer, as determined in step 500. The layers may further include rectangle boxes, as described above, to represent portals and/or interchanges.

At step 520, processor 122 identifies a plurality of computing systems of the computing architecture. The plurality of computing systems may be identified via a database containing information about the computing systems of the computing architecture or an alternative form of mapping. Further, processor 122 may identify the computing system by analyzing existing computing systems that can be accessed, for example, via network 150.

At step 530, processor 122 identifies computing layers implemented by each computing system. The layers implemented by each computing system may be may be determined based on a lookup from a database or from analysis of the functionality of each computing system.

At step 540, processor 122 displays the identified computing systems as a plurality of vertical bars over at least a portion of the horizontal bars. Each vertical bar represents a computing system and each vertical bar extends through the horizontal bars an amount corresponding to the computing layers implemented by the computing system represented by the vertical bar. Further, computing systems that implement access via a portal are displayed as a vertical bar contacting the portal rectangle and computing systems that implement a business to business interchange are displayed as a vertical bar contacting the business to business interchange rectangle.

At optional step 550, processor 122 displays an icon or mark on an area of display device 144 (and computing architecture) that corresponds to a device or function represented by the icon. The icons may represent a preselected area of the computing architecture, a data store of the computing architecture, a predefined computing function, a communication link between computing systems, as described above, and the like. Icons may be displayed based on a database, a mapping, or via analysis of existing 110 computing systems.

At optional step 560, processor 122a receives a selection of a computing system. For example, a user may select a computing system using touch screen 145, mouse 142, or keyboard 140.

At optional step 570, sub-systems of the selected computing system are displayed using horizontal and vertical bars as is described above.

Thus, there has been described a system and method for flexibly and dynamically representing a computing architecture at various levels of detail. The method displays an easy to understand model of a computing architecture that is useful for both technical and non-technical people.

The invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing description has been provided merely for the purpose of explanation and is in no way to be construed as limiting of the invention. While the invention has been described with reference to illustrative embodiments, it is understood that the words which have been used herein are words of description and illustration, rather than words of limitation. Further, although the invention has been described herein with reference to particular structure, methods, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A method for modeling a computing architecture, the method executed on a computer, the method comprising:
   identifying a plurality of computing layers, each computing layer representing a functional layer of the computing architecture;
   identifying a plurality of computing systems;
   identifying, for each of the plurality of computing systems, at least one of the plurality of computing layers that is implemented by the computing system;
   displaying a first plurality of bars in stacked relationship to each other, each of the first plurality of bars representing a computing layer of the plurality of computing layers;
   displaying a second plurality of bars approximately orthogonal to the first plurality of bars and over at least a portion of the first plurality of bars, each of the second plurality of bars representing a computing system, wherein each of the second plurality of bars extends through a portion of the first plurality of bars an amount corresponding to the identified at least one of the computing layers that is implemented by the computing system represented by the bar; and
   displaying a selected one of the first plurality of bars larger than the other bars for displaying details within the selected bar.

2. The method as recited in claim 1, further comprising if the computing architecture comprises a human interface portal, displaying a first rectangle stacked adjacent to the first plurality of bars, the first rectangle representing a human interface portal.

3. The method as recited in claim 1, further comprising:
   if the computing architecture comprises a business to business integration, displaying a second rectangle stacked adjacent to the first plurality of bars, the second rectangle representing a business to business integration.

4. The method as recited in claim 1, further comprising displaying an icon to indicate a preselected area of the computing architecture.

5. The method as recited in claim 1, further comprising:
identifying a data store of the computing architecture; and
displaying an icon to represent the identified data store.

6. The method as recited in claim 5 further comprising:
identifying a computing system corresponding to the data store; and
displaying the data store proximate a bar corresponding to the data store.

7. The method as recited in claim 1 further comprising:
identifying a plurality of data stores;
identifying interconnections between the plurality of data stores;
displaying each of the plurality of data stores as an icon; and
displaying line interconnecting the icons, the lines representing the identified interconnections between the plurality of data stores.

8. The method as recited in claim 1, further comprising identifying computing systems having a predefined computing function and displaying an icon to represent the predefined computing function.

9. The method as recited in claim 1, wherein displaying a first plurality of bars comprises displaying, from top to bottom, a horizontal bar for each of a presentation layer, a business logic layer, a data layer, and an infrastructure layer.

10. The method as recited in claim 1, further comprising displaying a conduit within one of the first plurality of bars, the conduit representing communication links between computing systems.

11. The method as recited in claim 1, further comprising:
receiving a selection of a computing system of the computing architecture;
displaying a first plurality of bars in stacked relationship to each other, each of the first plurality of bars representing a computing layer comprised in the selected computing system; and
displaying a second plurality of bars approximately orthogonal to the first plurality of bars and over at least a portion of the first plurality of bars, each of the second plurality of bars representing a sub-system of the selected computing system, wherein each of the second plurality of bars extends through a portion of the first plurality of bars an amount corresponding to the identified at least one of the computing layers that is implemented by the sub-system of the selected computing system represented by the bar.

12. A computer-readable medium having instructions stored thereon for modeling a computing architecture, the instructions, when executed on a processor, causing the processor to perform the following:
identifying a plurality of computing layers, each computing layer representing a functional layer of the computing architecture;
identifying a plurality of computing systems;
identifying, for each of the plurality of computing systems, at least one of the plurality of computing layers that is implemented by the computing system;
displaying a first plurality of bars in stacked relationship to each other, each of the first plurality of bars representing a computing layer of the plurality of computing layers;
displaying a second plurality of bars approximately orthogonal to the first plurality of bars and over at least a portion of the first plurality of bars, each of the second plurality of bars representing a computing system, wherein each of the second plurality of bars extends through a portion of the first plurality of bars an amount corresponding to the identified at least one of the computing layers that is implemented by the computing system represented by the bar;
identifying a data store of the computing architecture; and
displaying an icon to represent the identified data store.

13. The computer-readable medium as recited in claim 12, wherein the instructions further cause the processor to perform:
if the computing architecture comprises a human interface portal, displaying a first rectangle stacked adjacent to the first plurality of bars, the first rectangle representing a human interface portal.

14. The computer-readable medium as recited in claim 12, wherein the instructions further cause the processor to perform:
if the computing architecture comprises a business to business integration, displaying a second rectangle stacked adjacent to the first plurality of bars, the second rectangle representing a business to business integration.

15. The computer-readable medium as recited in claim 12, wherein the instructions further cause the processor to perform displaying an icon to indicate a preselected area of the computing architecture.

16. The computer-readable medium as recited in claim 12 wherein the instructions further cause the processor to perform:
identifying a computing system corresponding to the data store; and
displaying the data store proximate a bar corresponding to the data store.

17. The computer-readable medium as recited in claim 12 wherein the instructions further cause the processor to perform:
identifying a plurality of data stores;
identifying interconnections between the plurality of data stores;
displaying each of the plurality of data stores as an icon; and
displaying line interconnecting the icons, the lines representing the identified interconnections between the plurality of data stores.

18. The computer-readable medium as recited in claim 12, wherein the instructions further cause the processor to perform identifying computing systems having a predefined computing function and displaying an icon to represent the predefined computing function.

19. The computer-readable medium as recited in claim 12, wherein displaying a first plurality of bars comprises displaying, from top to bottom, a horizontal bar for each of a presentation layer, a business logic layer, a data layer, and an infrastructure layer.

20. A computer-readable medium having instructions stored thereon for modeling a computing architecture, the instructions, when executed on a processor, causing the processor to perform the following:
identifying a plurality of computing layers, each computing layer representing a functional layer of the computing architecture;
identifying a plurality of computing systems;

identifying, for each of the plurality of computing systems, at least one of the plurality of computing layers that is implemented by the computing system;

displaying a first plurality of bars in stacked relationship to each other, each of the first plurality of bars representing a computing layer of the plurality of computing layers;

displaying a second plurality of bars approximately orthogonal to the first plurality of bars and over at least a portion of the first plurality of bars, each of the second plurality of bars representing a computing system, wherein each of the second plurality of bars extends through a portion of the first plurality of bars an amount corresponding to the identified at least one of the computing layers that is implemented by the computing system represented by the bar; and displaying a selected one of the first plurality of bars larger than the other bars for displaying details within the selected bar.

21. The computer-readable medium as recited in claim 20, wherein the instructions further cause the processor to perform displaying a conduit within one of the first plurality of bars, the conduit representing communication links between computing systems.

22. The computer-readable medium as recited in claim 20, wherein the instructions further cause the processor to perform:

receiving a selection of a computing system of the computing architecture;

displaying a first plurality of bars in stacked relationship to each other, each of the first plurality of bars representing a computing layer comprised in the selected computing system; and displaying a second plurality of bars approximately orthogonal to the first plurality of bars and over at least a portion of the first plurality of bars, each of the second plurality of bars representing a sub-system of the selected computing system, wherein each of the second plurality of bars extends through a portion of the first plurality of bars an amount corresponding to the identified at least one of the computing layers that is implemented by the sub-system of the selected computing system represented by the bar.

* * * * *